United States Patent [19]
Crump et al.

[11] Patent Number: 5,503,785
[45] Date of Patent: Apr. 2, 1996

[54] PROCESS OF SUPPORT REMOVAL FOR FUSED DEPOSITION MODELING

[75] Inventors: S. Scott Crump, Wayzata; James W. Comb, St. Louis Park; William R. Priedeman, Jr., Wayzata; Robert L. Zinniel, Richfield, all of Minn.

[73] Assignee: Stratasys, Inc., Eden Prairie, Minn.

[21] Appl. No.: 252,694

[22] Filed: Jun. 2, 1994

[51] Int. Cl.⁶ .......................... B29C 41/02; B29C 41/52
[52] U.S. Cl. .......................... 264/40.7; 264/308; 264/317
[58] Field of Search .......................... 264/25, 40.1, 40.7, 264/308, 317

[56] References Cited

U.S. PATENT DOCUMENTS 5,260,009 11/1993 Penn ........................................ 264/40.1
5,340,433 8/1994 Crump .................................... 264/25 X
5,362,427 11/1994 Mitchell, Jr. ........................ 264/308 X Primary Examiner—Leo B. Tentoni
Attorney, Agent, or Firm—Moore & Hansen

[57] ABSTRACT

Processes and apparatus are disclosed for producing three-dimensional objects having overhanging portions freely suspended in space without any material of the object in direct, supporting engagement therewith in the final geometry of the object. A support structure is formed by depositing material which will be under the ultimately suspended portions of the object to be formed, during a process in which material is built up in layers to form the object as well as the underlying support structure. A readily removable support structure is formed along an interface with the underside of the suspended portion of the object structure. A weak, removable or breakable joint is formed along that interface by the use of an interface material which forms a weak or dissolvable bond with the material of the object. The release material may be deposited as a separation layer, or as a thin coating.

14 Claims, 2 Drawing Sheets

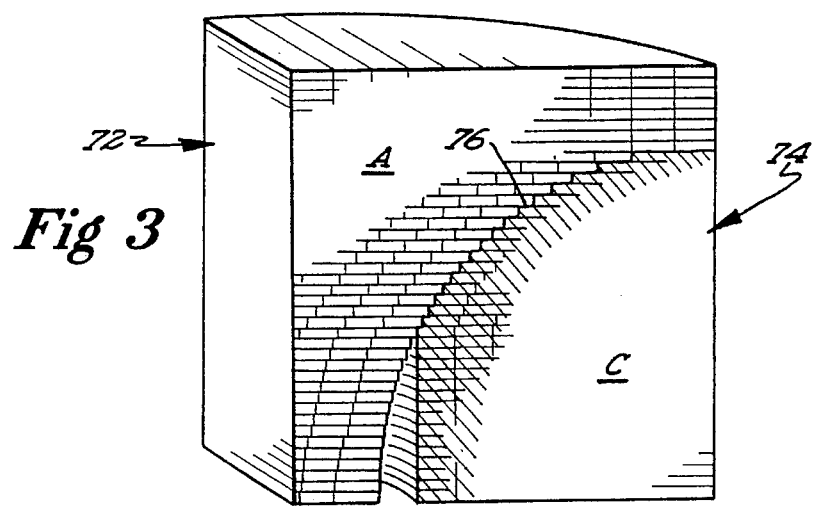
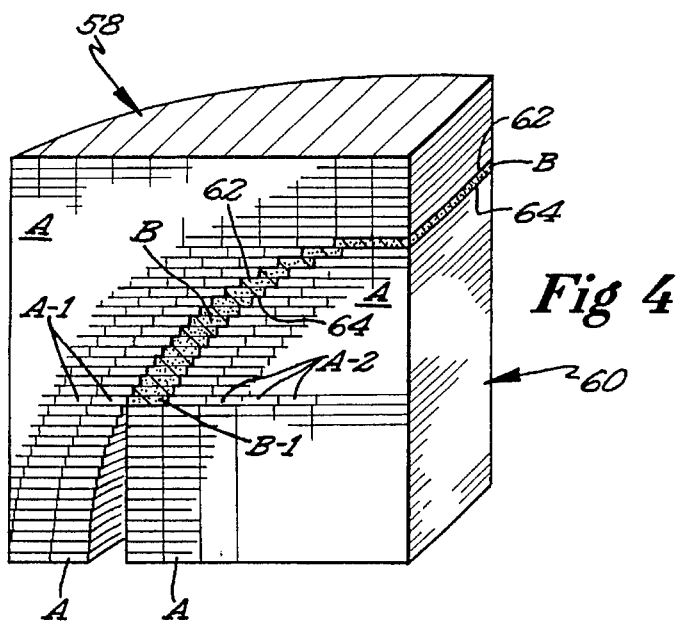
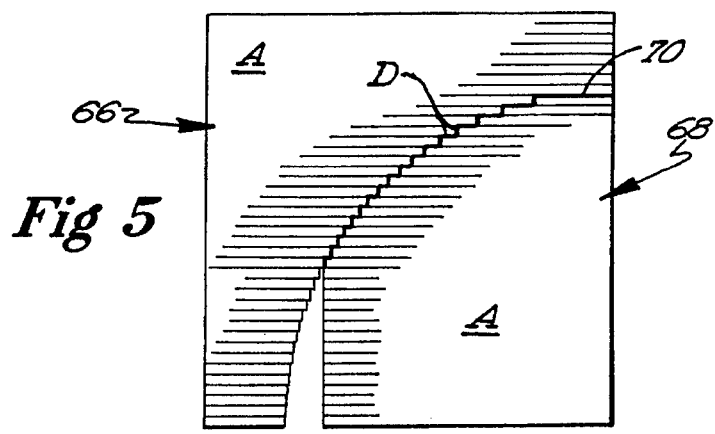

PROCESS OF SUPPORT REMOVAL FOR FUSED DEPOSITION MODELING

BACKGROUND OF THE INVENTION

This invention relates to an apparatus and process for making three-dimensional objects of a predetermined shape. One useful application for such devices is rapid prototyping of models or objects. Various systems exist for such modeling purposes, including systems which build up solidifiable material deposited in layers. Such prior art systems include stereolithography and fused deposition modeling. U.S. Pat. No. 5,121,329 owned by the common assignee herewith discloses a system of the latter type which forms three-dimensional objects by depositing repeated layers of solidifying material until the desired shape is formed.

A drawback to all of the currently existing three-dimensional modeling or prototyping systems to varying degrees is their inability to produce model geometry layers in free space without a supporting layer or structure in the ultimate geometry of the final object. Objects which have overhanging segments or portions which are not directly supported in the final geometry by the modeling material require the depositing of material as a supporting structure to support the overhanging portions as the object is being built up.

In computer-driven equipment as disclosed in the aforesaid U.S. Pat. No. 5,121,329, the design of an article to be formed is initially created on a computer, with special software being utilized to provide drive signals to drive motors for a model base member and a model material-dispensing head so as to dispense material in a fluid state in such a way as to create the article of the desired shape by depositing multiple layers of material. It is possible to utilize such a system to deposit material on a base or substrate in such a way, under appropriate software control, to produce additional geometry acting as a support structure for the overhanging or free space segments of the object being formed, during the object-forming process. Anchoring the model or object geometry to such support structure solves the problem of building the model or object, but creates the additional problem of removing the supporting structure from the object structure or geometry, without causing damage to the final model or object formed. If the support structure is formed from the same material as that used for building the desired object; the strength of the bond between the support and the object is just as strong as between each individual layer of the object or model itself. When force is applied to ultimately remove the support structure from the object, either a portion of the support structure material is left on the object, or a portion of the object is torn away. In either case, the object or model is destroyed or badly scarred to the point of being worthless.

This invention is directed to a process and apparatus which overcomes the aforesaid problems by forming a weak, breakable bond between the material of the object formed and the underlying material of the support structure so as to avoid any damage to the final object.

BRIEF SUMMARY OF THE INVENTION

This invention has as its primary objective the provision of a process and apparatus by means of which the interfacial bond strength between the material of the object and the underlying support material at the object/support interface is minimized so as to permit quick and easy removal of the support material with minimal effort, yet with anchoring strength sufficient to hold the model or object in place while it is being formed. Materials are selected for this purpose which provide a minimal interfacial bond strength, and therefore a readily separable joint, between the materials at the model/support structure interface.

In one advantageous embodiment of the invention, a first, solidifiable material is deposited in a predetermined pattern to form both the desired object and a separate, underlying support structure for freely suspended portions of the object, with a space therebetween which defines the underside of the overhanging portions of the object. A second, release material of a different composition than the material for the object is deposited in the aforesaid space. That material is selected so that it forms a weak, breakable bond with the first material in a readily separable joint along the object, support structure interface. Preferably, both the first and second materials are built up by depositing them in multiple layers, with the release material being deposited between spaced-apart layers of the object and the support structure at the same vertical level in the three-dimensional object and structural support composite.

In the aforesaid embodiment, wherein the release material is deposited as a layer, it provides the final layer of support in contact with the material of the object being formed, and is in contact with both the object and the support structure. However, this second material forms a bond with the material of the object which is substantially weaker than the bond of the primary modeling or object material with itself. This permits the support structure to be readily broken away.

When a separating, release layer is deposited in accordance with the foregoing embodiment, various materials may be successfully utilized. Examples of combinations of materials are set forth herein. For example, the material used to form both the object and the support structure may be a thermoplastic resin which solidifies at ambient temperatures, such as a polyamide, and the material for the separating layer may be a hydrocarbon wax.

In the embodiment in which the release material is deposited as a thin coating between the material of the object and the underlying support structure, the release material is deposited in flowable form at the interface between the modeling material and the underlying support structure in a layer so thin that its geometry may be disregarded in the construction of the model and supports. In such a process, the material for forming the model or object will preferably again be a thermoplastic resin deposited in liquid form, such as a polyamide; and the release material may be a mold release type of material, such as fluorochemicals, silicones, or stearates, a polymer soluble in a solvent or water, or dispersions including waxes or polymers.

The apparatus disclosed herein utilizing a pair of dispensers, each having its own discharge tip for a different material to be dispensed, may also be utilized to build up the object or model from a first material, and to form the underlying, support geometry from a second material which forms a weak bond with the underside of the portion of the object being supported. For example, as set forth herein, the material for making the object may be a thermoplastic resin or an investment casting wax, with the material for the support structure being a wax which forms a weak bond at its contacting, interface with the material of the object.

A beneficial feature of the apparatus utilized in the aforesaid processes is that two dispensers, each having a discharge tip, are mounted on a single dispensing head. Controllable mechanisms are provided to move the dispensing head and a material-receiving substrate relative to each other along X, Y, and Z axes to build up a three-dimensional object in layers. Each of the dispensers carries a discharge nozzle in which the tip is mounted. Preferably, one of the nozzles is vertically adjustable relative to the other, so that the discharge tip of the nondispensing nozzle may always be positioned above the discharge tip of the dispensing nozzle at a level sufficient to clear the material being dispensed by the dispensing nozzle so as to avoid interference therewith.

These and other objects and advantages of the invention disclosed herein will become readily apparent as the following description is read in conjunction with the accompanying drawings wherein like reference numerals have been used to designate like elements throughout the several views.

BRIEF DESCRIPTION OF THE DRAWINGS

FIG. 3 is a schematic showing of one form and method of building up a releasable support structure for an object being formed;

FIG. 4 is a schematic, perspective view illustrating the formation of a different, release layer embodiment;

FIG. 5 is a schematic illustration of still another embodiment utilizing a release coating.

DESCRIPTION OF THE PREFERRED EMBODIMENTS

The support structure formation and removal system for use in the building of three-dimensional objects, as disclosed with respect to FIGS. 3–5, may be employed with respect to various types of modeling or prototyping systems. Particularly applicable are those systems which form three-dimensional objects by the formation of successive, adjacent layers or laminae, particularly including such systems as disclosed in U.S. Pat. No. 5,121,329. The separation layer and separation coating processes disclosed herein would be applicable wherever a support structure is required in the modeling or object-formation process, under overhanging portions of a model which will ultimately be suspended in free space.

Figure 1:
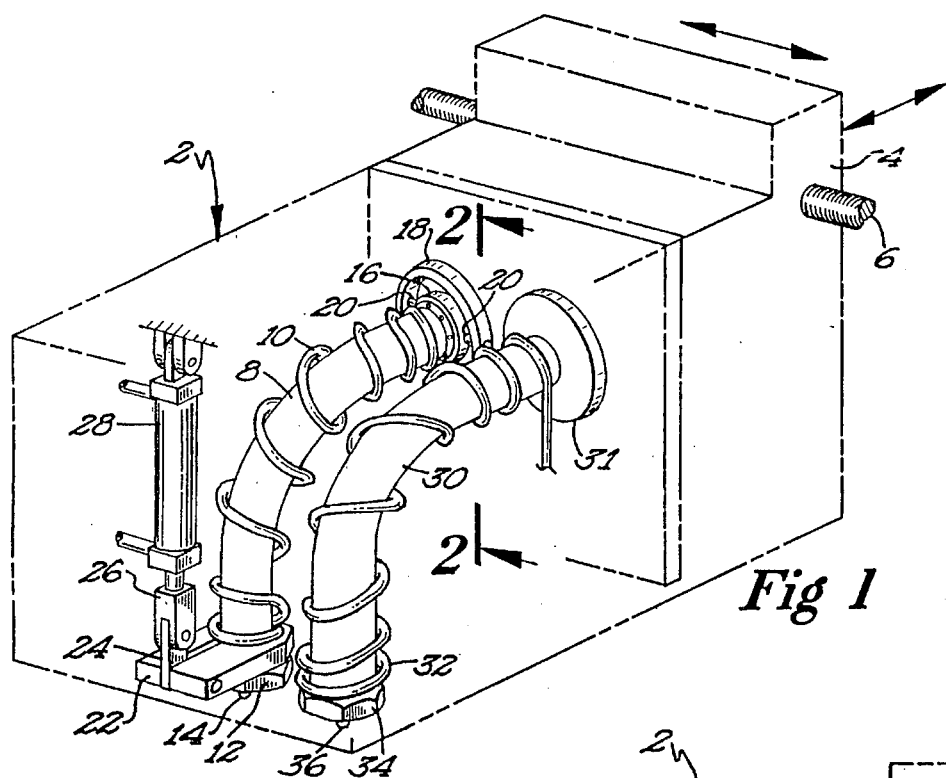
FIG. 1 is a perspective view of a dispensing head and dispensing nozzle mechanism according to the invention.
Figure 2:
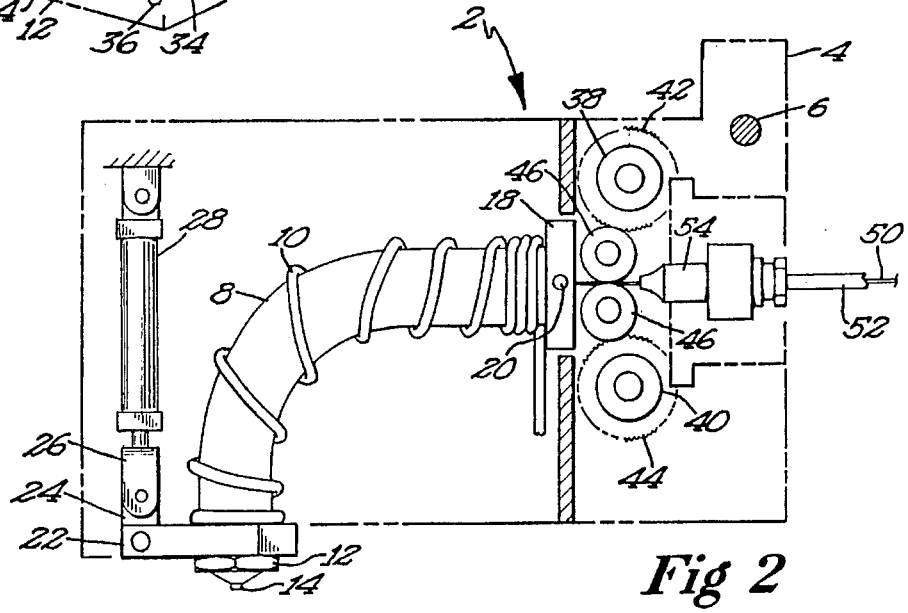
FIG. 2 is a vertical section view of the dispensing head of FIG. 1, taken along lines 2—2 thereof.
Figure 6:
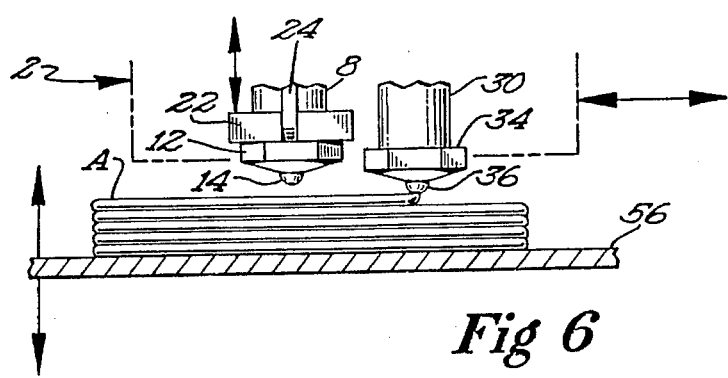
FIG. 6 is a fragmentary, elevation view showing the two dispensing tips of FIGS. 1 and 2 in a particular dispensing mode.

The preferred material deposition and build-up process is of the type disclosed in U.S. Pat. No. 5,121,329. FIGS. 1 and 2 show a dispensing head 2, having a pair of dispensers 8 and 30 mounted thereon, for use in such a system, to carry out the support formation and removal processes as disclosed herein. For that purpose, the dispensing head 2 is mounted for relative movement with respect to a material-receiving base 56 as shown in FIG. 6 so as to be able to deposit material in multiple passes and layers to form an object of a predetermined shape. Such relative movement is to take place along X, Y, and Z axes to permit depositing the material in successive layers so as to form a three-dimensional object. Stepper motor-driven screws as disclosed in the aforesaid U.S. Pat. No. 5,121,329 may be utilized to accomplish such relative movement. Preferably, dispensing head 2 will be mounted on a base carriage 4 which is moveable in both X and Y directions, a lead screw 6 as shown in FIGS. 1 and 2 being utilized to provide movement in one such direction. Carriage 4 is mounted in such a way as to be moveable in a second, Y direction perpendicular to the direction of extent of lead screw 6 by a second lead screw. Both lead screws would be driven by controllable motors, such as stepper motors. Preferably, the aforesaid relative movement is under the control of a computer-controlled, CAD/CAM system in which the design of the article to be formed is initially created on a computer. Software is utilized to translate the three-dimensional data in the computer into controlled movement of the drive motors for the lead screws so as to move the dispensing head 2 through a predetermined pattern of movement to successively deposit and build up layers of material to the desired shape. In the embodiment as described, the base or receiving substrate 56 (FIG. 6), is moveable in a vertical or Z direction to complete the three dimensions of movement.

A first dispenser, preferably in the form of a tubular member or conduit 8 is provided for dispensing one material. In the applications where the supply material is provided in solid form, such as a flexible filament or strand, a heating coil 10 is provided on dispenser 8 so as to heat and melt the solid material so that it is provided in a fluid state to a dispensing nozzle 12 having a discharge tip 14. Tip 14 defines a discharge outlet for the liquid material being dispensed. That material will normally be one which will solidify upon encountering predetermined conditions, such as the controlled ambient temperature at which the object forming or modeling takes place. Tubular dispenser 8 has a cap 16 at its receiving end, which is secured to a mounting ring 18. For reasons hereinafter set forth, dispenser 8 is mounted for selective, vertical adjustment, preferably by utilizing a pivotal connection to mounting ring 18. For that purpose, a pair of generally horizontally extending pivot pins 20 project from opposite sides of cap 16 and are secured to mounting ring 18.

A lift bracket 22 is attached to the opposite end of dispenser 8 adjacent to tip 14 and carries an attachment plate 24. A lift device, such as the double acting cylinder 28 shown, has its piston 26 secured to attachment plate 24. Cylinder 28 may be an air or hydraulic fluid cylinder. It is a reciprocally operable, double-acting cylinder which is fluid powered so as to extend and retract piston 26 in a vertical direction. Such movement, under the control of a software program which coordinates the dispensing of material from the two dispensers illustrated, permits the raising and lowering of discharge tip 14. Such vertical, height adjustment of tip 14 serves a particular purpose with respect to a second dispenser 30 as described below. It is to be noted that lift device 28 could comprise various types of mechanisms, including a spring-loaded solenoid which extends when electrically actuated, and utilizes a spring return to carry out periodic, reciprocal movement of piston 26. Piston 26 is normally retracted to hold tip 14 at a predetermined, elevated level with respect to tip 36 of dispenser 30, as illustrated in FIG. (6). Dispenser 30 also carries a nozzle 34 at its dispensing end on which tip 36 is mounted. Here again, a heating coil 32 is preferably utilized to melt a solid supply material conducted into tubular dispenser 30 to a liquid state from which it is dispensed through nozzle tip 36. Dispenser 30 is secured to carriage head 4 by a mounting cap 31.

Tips 14 and 36 are separately connected to separate supplies or sources of materials of different compositions, provided in a fluid state, so as to be solidifiable under predetermined conditions. The materials could be directly supplied in a liquid state from a reservoir, as by a pump. The materials may also be initially supplied in solid forms as in the form of a flexible filament or strand as shown and described with respect to FIG. 5 of U.S. Pat. No. 5,121,329.

The flexible strand will be made of solid material which can be heated relatively rapidly above its solidification temperature, and which will quickly solidify upon a small drop in temperature after being dispensed onto receiving base or substrate 56. A flexible strand of thermoplastic resin, wax, or metal, comprising various materials as hereinafter set forth may be utilized. Such a strand or filament is indicated at 50 in FIG. 2, and is conveyed from a supply spool (not shown) through a tubular conduit and guide housing 54 by a suitable material advance mechanism. A pair of pinch rollers 46 may be effectively utilized as such a mechanism, for gripping and advancing filament 50. Intermittent, controlled actuation of pinch rollers 46 is accomplished by stepper motors 38 and 40, each of which drives one of the spur gears 42 and 44 through which driving power is transmitted to rollers 46.

Motors 38 and 40 are progammably controlled by appropriate software to intermittently actuate pinch rollers 46, and thus to selectively advance the filament material for a particular dispenser 8 or 30. The same material advance mechanism described above with respect to filament 50 for dispenser 8 may also be used to advance a filament to dispenser 30 from a separate supply spool.

FIGS. 3–5 illustrate different methods for providing a removable support structure under overhanging, freely suspended portions of a three-dimensional object to be made. FIG. 4 shows a particularly advantageous version in which a release layer B is utilized to provide a separable, breakable joint between an object or model 58 and a support structure 60. In this embodiment, the object 58 and the support structure 60 are made of the same material A. As illustrated, the object 58 has an overhanging portion along the right side thereof, the underside of which is designated by reference numeral 62. The adjacent, top face or surface of support structure 60 is designated by reference numeral 64. Surfaces 62 and 64 are spaced apart to define a joint and separation space therebetween which is filled with a release material B.

The materials A and B may be deposited in various ways to form the composite structure comprised of the object 58, support structure 60 and release layer B in a three-dimensional configuration illustrated by way of example in FIG. 4. Utilizing the dispensing apparatus of the type disclosed herein, the material is deposited from discharge tips 14 and 36 in tracks or paths, which may be rectilinear in the X - Y plane as illustrated in FIG. 4. Starting at the substrate 56 (FIG. 6), the material is built up in layers, with multiple paths being deposited at each vertical level along the Z axis, from the two dispensers 8 and 30. The layers for object 58 as well as for support structure 60 are built up in the pattern shown in FIG. 4 until the level is reached where the overhang or suspended portion of object 58 would otherwise extend out significantly into free space, thus requiring support. Thus, after layer strips A-1 are deposited for object 58, a layer strip B-1 of release material B is deposited at the same level or height. Thereafter, support layers A-2 are deposited at the same level. This process continues on as the dispensers 8 and 30 are controllably utilized, by the intermittent actuation of stepper motors 38 and 40 to feed and dispense the desired supply of materials A and B in solidifiable, liquid form. Receiving substrate 56, carrying the deposited material, is vertically adjusted with respect to dispenser 2 to successively form the layers of material, preferably in strips, as illustrated in FIG. 4 to build the object 58 as well as support structure 60 to the entire, desired height. Release layer material B is intermittently dispensed at each Z or height level to sequentially fill up the entire separation space defined between adjoining surfaces 62 and 64 of the object 58 and support structure 60. After the composite structure, as illustrated in FIG. 4, is formed, the support structure 60 may be readily removed because of the weak or removable joint defined by material B.

It will thus be seen that the secondary material B is used to produce the final layer of support in contact with the material A defining the underside 62 of the overhanging portion of object 58. The release material B is thus deposited as a layer conforming to the contour of the overhang, in the space between the object 58 and support structure 60. The material B is selected to form a bond with the object or modeling material A which is substantially weaker than the bond of the material A with itself. When separating force is applied to the support structure 60, it breaks away, possibly leaving some of the release material B attached to the underside 62 of object 58. Due to the weak nature of the bond of the release material B with the object or modeling material A, any release material remaining on the object may be easily peeled away without causing damage to the model or object itself. Such removal of the support structure is facilitated by providing the release material B in a relatively thin layer having a thickness between 0.0001 and 0.125 inches, and preferably in a range of 0.005 inches to 0.020 inches as defined by the space at the interface between adjacent surfaces 62 and 64 of the object 58 and support structure 60.

Various materials may be utilized to accomplish the aforesaid result of quick and easy removal of the support structure 60 from the formed object 58, as described with respect to FIG. 4. The material A utilized to form the structure of the object 58, as well as the support structure 60 is preferably a thermoplastic material which will readily solidify at predetermined ambient conditions into which it is dispensed. Various thermoplastic resins are suitable, as are investment casting waxes. The release material may be a hydrocarbon wax blend. The modeling or object material A has a relatively high tensile strength. For example, when a polyamide modeling material A having a relatively high tensile strength of approximately 2700 p.s.i. was utilized with a release material B comprising a hydrocarbon wax blend, the formed object 58 and support structure 60 readily separated by breaking apart along the seam or separation zone defined by release material B. This was due to the large difference in surface tension of the release material B relative to the modeling or object material A. The much reduced surface tension of the release material B, relative to that of the object and support structure material A, decreases the interfacial bond strength at the joint defined by material B so as to permit the support structure 60 to be easily broken away and separated with minimal damage to the underside 62 of the object 58.

As another example, a polyamide modeling material and a water-soluble wax for the release material B have been successfully utilized. As in the preceding example, not only is the interfacial bond strength diminished, but also the support structure dissolved in room temperature water in about five minutes. By utilizing a release material that is water soluble, whereas the material A for the object and structural support is not, any remaining support material may be readily dissolved, and thus removed, by placing the composite object 58–60 in a bath. This avoids mechanically removing the support structure.

By way of a further example, the material A for the object 58 and support structure may be made of a wax and polymer blend, with a water soluble wax being used for the release material B at the separation space or joint. Here again, a very weak, interfacial bond is provided permitting easy separation of the support structure, and also the release material B readily dissolves in room temperature water so as to greatly facilitate the separation of the support structure 60.

FIG. 5 illustrates an embodiment similar to that of FIG. 4, but in which the release material is applied in liquid form as a thin coating 70 along the separation line or joint between an object 66 and a support structure 68. Here again, both the object and the support structure are made from the same material A. The material A is laid down in layers, which are built up vertically in the manner described above with respect to FIG. 4. However, in this version a flowable agent D is applied at the contacting faces between the object 66 and support structure 68. This agent disrupts the molecular bonding that would normally occur in the same material A between the object and the support structure, producing a bond that is substantially weaker at the contact face designated by reference numeral 70. When tensile force is applied to the composite structure 66, 68, the support structure 68 readily breaks away cleanly without leaving any residue material or damaging the remaining model or object contact face. The release agent in this system forms a layer D so thin that its geometry may be disregarded in the construction of the object and the support structure. The thin release coating is preferably less than 0.002 inches in thickness.

Solutions, emulsions, and dispersions may be utilized as the release coating D. The material A for the object 66 and support structure 68 may be any of those materials mentioned above for material A with respect to FIG. 4. Among the satisfactory release coating materials are solvent-soluble compounds such as polymers, e.g., acrylates, and organic compounds, e.g., stearic and azelaic acids. Water soluble polymers are also satisfactory for the release coating and includes such material as polyethylene oxide and glycol-based polymers; polyvinyl pyrrolidone-based polymers; methyl vinyl ether, and maleic acid-based polymers; polyoxazoline-based polymers; and polyquaternium II. Conventional mold release materials may be also successfully employed as the release coating. Those materials include fluorochemicals, silicones, lecithins, and stearates. Dispersions may also be used for the release coating, including waxes, e.g., paraffins, microcrystalline and polyethylenes, as well as polymers.

Examples of the material A and release coating D used at 70 in the FIG. 5 embodiment include a polyamide as the material A for the object 66 and support structure 68, with the coating being a silicone. The aforesaid material A had a tensile strength of approximately 1000 p.s.i., and the samples built with a silicone coating at the separation joint 70 between the object and the support structure had a tensile strength at the interfacial joint of approximately 105 p.s.i., and were easily separated at the joint 70 by bending the composite sample.

A further combination of materials successfully utilized for the coating embodiment of FIG. 5 comprised a wax and polymer blend for the object and support structure A, with a stearic acid solution for the release coating. The samples built from these materials as illustrated in FIG. 5 had a tensile strength so low at the separation joint 70, that the composite structure as shown in FIG. 5 cracked in a test fixture.

There are particular advantages from utilizing the embodiments of FIG. 4 or FIG. 5 with either a release layer or a release coating between the overhanging portion of the object and the underlying support structure formed from the same material A. The first advantage relates to shrink characteristics. All materials shrink to some extent. If materials of significantly different shrink characteristics are used for the object or model structure, as well as the adjoining support structure, there will be a large shrink differential along the separation joint between the two materials. This can cause extreme stresses and bond failures, with object distortion. Those potential harmful effects are minimized by using the same mass of material A in both the object structure 58 or 66 and in the support structure 60 or 68, with only a relatively thin separating layer or coating in between. Melting and modeling temperatures of different materials also come into play. The materials must be selected so that they are compatible with respect to the temperatures utilized so as to be able to achieve their intended functions. Thus, even though machineable wax, as a support structure material, requires a relatively high ambient temperature of 60° C. to obtain laminating strength to build a large, thick support structure, it will laminate reasonably well even at the lower 30° C. modeling temperature of a thermoplastic object and support structure, such as casting wax, when applied in a relatively thin layer in the interface or separation zone between the object and the support structure. In other words, the relatively thin layer of a release material B as shown in FIG. 4 can laminate sufficiently well, even at the modeling temperature of material A, to form a layer with sufficient strength to support the object material A above it. The relatively weak bond or laminate formed by such a release layer of material B is desirable for achieving the quick and easy separation of the support structure 60.

FIG. 3 shows a third embodiment which may be successfully utilized with the dispensing apparatus of FIGS. 1, 2, and 6. In this version, a first material A is utilized to form the object 72, with a second material C, of a different composition, being utilized to build up the support structure 74. Those two structures are in interfacial contact along a separation line or joint 76. Here again, the two materials A and C would be deposited in layers by multiple passes of the dispensing head 2 as described with respect to FIG. 4, each pass of the dispensing head forming an elongated strip or track as illustrated in FIGS. 3 and 4. The same combinations of materials for the object material A and the support structure material C may be utilized as described above as to FIG. 4 with respect to materials A and B.

Since, as described above with respect to FIG. 4, different materials will be dispensed from nozzle tips 14 and 36 in the same horizontal plane or vertical level, i.e., tracks or strips A-1 and A-2 and B-1 with respect to FIG. 4, there is a problem of interference of the nondispensing nozzle and its tip with the material being deposited by the dispensing nozzle. That problem is overcome by providing the means described above with respect to FIGS. 1, 2, and 6 for vertically adjusting the height of one of the dispenser tips with respect to the other. Thus, with respect to those figures, it is to be noted that dispenser 8 is vertically adjustable, at least at its discharge end where nozzle 12 and tip 14 are located, by means of lift device 28. Dispenser 30 may be utilized for the dispensing of material A, with dispenser 8 serving to dispense material B or C, with reference to FIGS. 3 and 4. As indicated in FIG. 6, nozzle 12 and thus tip 14 will normally be held at an elevated level by lift device 28, above discharge tip 36 of dispenser 30. The height differential is shown on an enlarged scale in FIG. 6 for emphasis. It is only necessary that tip 14 be on the order of a fraction of an inch, even $1/16$th inch, above tip 36, when tip 36 is dispensing. When material is to be discharged from dispenser 8 through tip 14, device 28 is actuated to extend piston 26 and lower tip 14 so that it is below tip 36 by the same order of magnitude. This arrangement avoids any possible interference of one nozzle tip with the material being dispensed by the other.

It is to be noted that the two dispensers carried on the single dispensing head 2 may take forms other than that of the elongated tubular dispenser/liquefiers illustrated in FIGS. 1 and 2. If, rather than supplying a meltable solid in the form of a filament or rod to the dispensers, the materials to be dispensed are directly supplied as a liquid from a reservoir, by means of a pump, then the elongated tubular dispensers, with their heating coils would not be required. Also, with respect to the embodiment of FIG. 5, the thin coating of release material could be pumped from a syringe through a needle serving as a discharge tip. Such a discharge assembly could serve as one of the dispensers mounted on head 2. Also, for that same application, the liquid release material could be discharged through a brush tip, having bristles, which could serve to wipe the liquid onto the upper surfaces of support structure 68 at the interface 70 with object or model structure 66. It is anticipated that the liquid coating may also be wiped along the vertical face of each layer in the support structure 68, where there is a separation from the adjacent, vertical face on the underside of object 66. The liquid material supplied as the thin coating does solidify and at least partially harden before the next, adjacent layers of the material A of object 66 are applied.

Alternatively, the separate structural and release materials may be dispensed from a single nozzle tip on a single dispensing head having multiple supply passages. Such a dispensing head configuration is shown in FIG. 6 of U.S. Pat. No. 5,121,329, and described in column 14, lines 11–36. In this dispensing head embodiment, the separate materials would be supplied in a liquid state, either by melting a filament or rod or by pumping liquid from a reservoir, through separate flow passages in the dispensing head. Suitable flow regulators would be utilized to selectively and intermittently dispense one material or the other.

It is anticipated that various changes may be made in the apparatus and processes described herein without departing from the spirit and scope of the invention as defined by the following claims.

What is claimed is:

1. A process for producing three-dimensional objects having overhanging portions freely suspended in space comprising:

dispensing a first, solidifiable structural material in a predetermined pattern, to deposit multiple layers of said material defining a three-dimensional composite body comprised of both a three-dimensional object and a separate three-dimensional support structure underlying overhanging portions of said object requiring support during layer deposition, with the object and the support structure being separated by a space therebetween defining the underside of said overhanging portions of the object; and dispensing a second, release material in said space between the object and the support structure, in a multiple pass deposition process coordinated with the dispensing of said first material and in contact therewith, with said second material being of a different composition than said first material such that said second material forms a weak, breakable bond with the first material in a readily separable joint in said space between the object and the support structure.

2. The process of claim 1 wherein:

said release material is deposited as a layer conforming to the contour of said space.

3. The process of claim 2 wherein:

said release layer is built up in multiple layer segments by intermittent deposition of the release material between adjacent, spaced-apart layers of the object and the support structure at the same vertical level in the three-dimensional composite.

4. The process of claim 2 wherein:

said release material is deposited to a thickness of between 0.0001 inches and 0.125 inches in a vertical direction in each deposition pass.

5. The process of claim 1 wherein:

said structural material is a thermoplastic resin and said release material is a machineable wax.

6. The process of claim 1 wherein:

said structural material is an investment casting wax and said release material is a machineable wax.

7. The process of claim 1 wherein:

said release material is deposited as a thin coating in said space in contact with adjacent faces of the object and support structure formed by the first, structural material.

8. The process of claim 7 wherein:

said thin coating is a negligible thickness sufficient to cover the adjacent faces of the object and support structure and to disrupt the molecular bonding that would normally occur between the portions of the first structural material defining those faces.

9. The process of claim 8 wherein:

said structural material is a thermoplastic resin and said release material forming said coating is a water soluble polymer.

10. The process of claim 8 wherein:

said structural material is a thermoplastic resin and said release material forming said coating is a solvent soluble polymer.

11. The process of claim 8 wherein:

said structural material is a thermoplastic resin and said release material forming said coating is a silicone.

12. The process of claim 10 wherein:

said structural material a thermoplastic resin and said release material forming said coating is a stearic acid solution.

13. The process of claim 1 wherein:

the first structural material and the second release material are dispensed from two, separate nozzles, each of which has a discharge tip, and which are mounted on a single dispensing head for relative movement with respect to a material receiving base along "X", "Y" and "Z" axes, and controlling the dispensing of the structural material and release material from said nozzles so that material is dispensed from only one nozzle at a time.

14. The process of claim 13 wherein:

one of said nozzles is vertically adjustable relative to the receiving base, and controllably adjusting the height of said one nozzle during the process of dispensing the structural material and the release material so that the discharge tip of the nondispensing nozzle will always be above the discharge tip of the dispensing nozzle at a level sufficient to clear the material being dispensed by the dispensing nozzle, during the material dispensing process.

* * * * *